Sept. 3, 1940.   W. J. VOIT ET AL   2,213,479
METHOD OF MANUFACTURING A GAME BALL
Filed Oct. 25, 1938
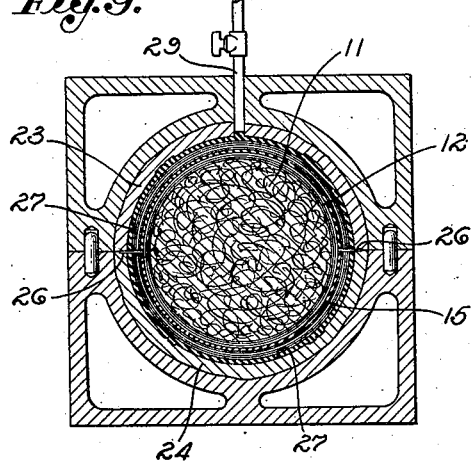
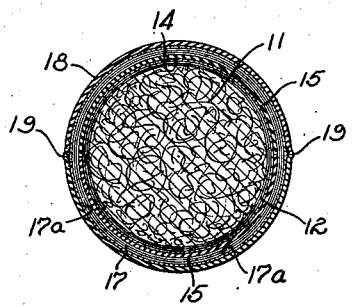
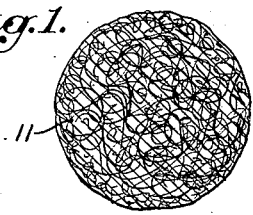
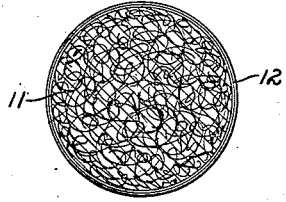
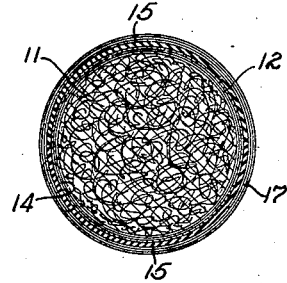
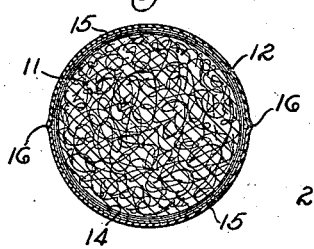
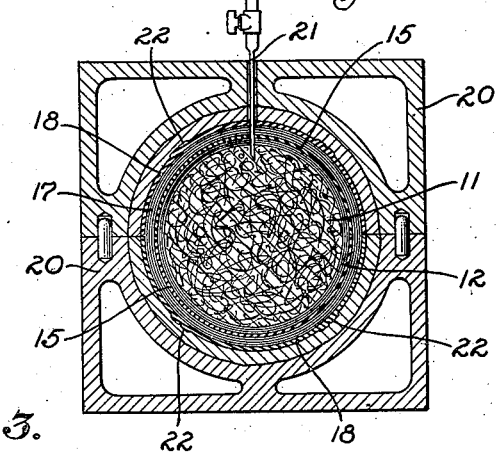
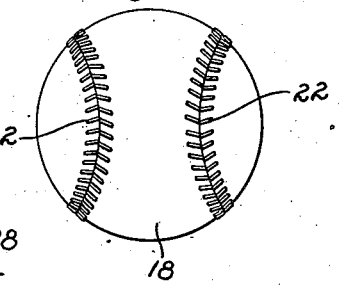
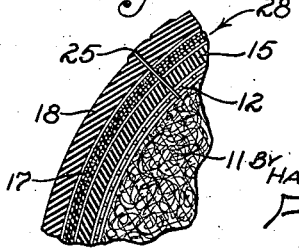
INVENTORS
WILLIAM J. VOIT
LEITH C. WEIMER
BY HARRIS, KIECH, FOSTER & HARRIS
FOR THE FIRM
ATTORNEYS.

Patented Sept. 3, 1940

2,213,479

UNITED STATES PATENT OFFICE 2,213,479

METHOD OF MANUFACTURING A GAME BALL

William J. Voit, Los Angeles, and Leith C. Weimer, South Gate, Calif.; said Weimer assignor to said Voit Application October 25, 1938, Serial No. 236,856

6 Claims. (Cl. 154—16)

This invention relates to game balls and especially to baseballs of the soft ball type in which a casing or cover encloses a center or core of compacted fibrous material.

A ball produced in accordance with this invention and the method of manufacture by which it is produced are similar to the game ball and method of producing it constituting the subject matter of Patent No. 2,127,487, issued on August 16, 1938, to William J. Voit. The ball and manufacturing method of this invention represent an improvement upon the ball and manufacturing method described in that patent.

Balls of this general type comprise centers or cores of some fibrous material such as kapok, wool, cotton waste and the like, formed into generally spherical shape, and a cover for the center of rubber, leather, or other suitable wear resisting material. In the ball described in Patent No. 2,127,487 the kapok core is wound with strands of yarn, cord, or other fibrous material, and a rubber cover is molded about this core. That invention relates to the establishment of internal pressure within the core while the rubber cover is being vulcanized thereon within a mold, and to the subsequent relief of that pressure. This internal pressure forces the material of the rubber cover into intimate contact with the inner surface of the mold to give the ball a true spherical shape, to cast accurately upon its outer surface designs which may be formed on the inner surface of the mold, and to insure an even distribution of the material of the cover in a uniformly dense, solid layer devoid of soft spots.

The present invention has as one of its features the provision of an inner layer or wall of rubber, additional to the outer rubber cover of the abovementioned patent, for the two-fold purpose of rendering the internally established pressure more effective and providing a stronger, more durable outer casing for the ball.

Another purpose of the invention is the provision of specific means of a novel character for the establishment of internal pressure at the time of vulcanizing the ball, and of specific means of a novel character for the application of the cover material to the core prior to vulcanization.

Another feature of our invention relates to the character of the core and has as its purpose means for preventing the core material from becoming unduly dry with the result that it is pulverized by the heat of vulcanization or by treatment incident to its use in play.

Other objects will be apparent from the following description of our invention and from the drawing by which it is illustrated as well as from the claims in which the invention is specifically defined.

No claims are made in this application to the game ball as an article of manufacture, such claims being the subject matter of a separate divisional application, Serial No. 347,894, for a Game ball, filed July 27, 1940, by the same inventors.

In the drawing,

Fig. 1 is a sectional view of the sphere of kapok which constitutes the central portion of the ball.

Fig. 2 is a sectional view of the kapok sphere after it has been wrapped with a few strands of yarn.

Fig. 3 shows in section the yarn-wound kapok sphere after it has been covered with an inner layer of rubber.

Fig. 4 shows in section the ball center after the next step has been performed of winding additional strands of yarn upon it.

Fig. 5 shows in section the ball with the rubber material of the outer cover in position ready for vulcanization.

Fig. 6 is a sectional elevation of a mold and the ball within the mold completely assembled and ready for the step of vulcanization.

Fig. 7 shows in vertical elevation the completed ball.

Fig. 8 is a fragmentary sectional view on an enlarged scale showing the details of construction of the ball.

Fig. 9 is a sectional elevation of a mold and ball center within the mold, ready for application of the covering material according to an alternative method.

The first step in manufacturing the ball is the formation, according to any of the well known methods familiar to those skilled in the art, of a compacted, roughly spherical mass 11 of kapok, wool, cotton waste, or like material. One method of forming the ball of kapok consists of pressing a measured quantity of the kapok between two hemispherical metallic cups (not shown). While thus compressed, a few threads are passed back and forth between the mass of kapok by means of a needle which is inserted through slits formed in the cups, and the ends of the threads are tied, holding the kapok mass roughly to shape. The cups are then removed, and a few strands 12 of yarn are wound around the kapok 11, by any convenient means, in sufficient number to prevent stray fibers from projecting from the surface of the center. The ball center then appears as shown in Fig. 2.

The center is next placed in an air-tight chamber (no shown) into which steam at a pressure of about 50 pounds is admitted. The steam penetrates all parts of the kapok mass and moistens all of its fibers. It has been found that about a quarter of an ounce of water is absorbed in this way by the kapok of a 4 inch ball, and other amounts proportionately by balls of other diameters.

The saturated kapok mass 11 is then removed from the steam chamber, and after cooling is dipped in or otherwise coated with rubber cement or latex, indicated in the drawing at 14, and is covered with a thin wall 15 of vulcanizable rubber. This wall 15 is preferably gas-tight after it has been applied and can be put on in any desired manner. We prefer to apply two hemispherical sheets of rubber in such manner that they are integrally joined at their meeting edges 16 to form a hollow sphere about the kapok.

The ball at this stage in its manufacture is wound with strands of yarn forming a layer 17 which is preferably of substantially greater thickness than that of the strands 12. These strands are preferably coated with latex or the like before or during the winding operation. Under some conditions it may be preferred to use fabric woven from fibrous material in place of wound strands of yarn or thread. This may be done by applying fitted sections of the fabric to the rubber wall 15, which may be secured in position by rubber cement or any other well known means. The center or core is then preferably dipped in or otherwise coated with latex or similar material, as indicated at 17a, and covered with an outer casing 18 of vulcanizable rubber which, like the wall 15, is preferably made by applying two hemispherical sheets of rubber to the ball center in such manner that they are integrally joined at their meeting edges 19. The ball is now completely assembled and ready for the molding operation. It has a diameter somewhat greater than the diameter which it is intended the finished ball shall have.

The assembled ball is placed in a two-part mold 20, the cavity of which is a sphere of the diameter of the finished ball. Since it is somewhat larger than the cavity of the mold, the ball is slightly compressed when the mold parts are brought together.

An internal pneumatic pressure is next established within the ball center. This may be accomplished by the use of a hypodermic needle 21 to inject air or other fluid through the outer rubber cover 18, the strands 17, and the inner rubber layer or wall 15 into the ball center in the manner described in Patent No. 2,127,487, or it may be accomplished by means of a gas-producing chemical either in liquid form or in the form of a pill (not shown) placed somewhere in or upon the kapok center 11 prior to the application of the rubber wall 15 thereon. Such chemicals generate gas when heated, which in this case is effected by the heat used to vulcanize the ball in the mold. This internal pneumatic pressure may also be created by wetting the kapok 11 with liquid ammonia before it is covered with the inner rubber wall 15, or the water with which the kapok is moistened as heretofore described may be relied upon to form steam when the heat of vulcanization is supplied.

In any event, the injected air, chemically produced gas, ammonia gas, or steam establishes within the ball center and within the gas-tight wall 15 an internal pneumatic pressure which forces outwardly the wall 15, the layer of strands of yarn 17, and the outer cover 18 against the inner face of the mold 20. While this pressure exists, a vulcanizing heat is applied to the mold. The vulcanizable rubber of the outer cover 18 in the softened condition induced by the vulcanizing heat is pressed into intimate contact with the mold face and has formed on its outer surface a smooth spherical contour broken only by the relief and indented markings 22 corresponding to the design impressed upon the mold walls. This design may be in simulation of the seams and stitches of a leather covered ball as shown at 22 in Fig. 7, or of any other desired character.

The heated soft rubber material of both the layers 15 and 18 is forced into and between the strands of yarn of the layer 17 by the pneumatic pressure within the ball, thoroughly impregnating the strands, the material of one layer meeting, coalescing, and becoming integrated with that of the other layer. After vulcanization, the cover of the ball becomes a single integral structure of rubber 28 (Fig. 8) extending from the inner face of the inner layer 15 to the outer face of the outer wear resisting cover 18, in which are embedded strands of yarn 17. Such a cover is wear resisting, pliable, and, by virtue of the embedded strands of yarn or cord, is resistant to circumferential stretching caused by blows delivered to it when in play. Because of the integrated character of the cover, no relative displacement of its parts is possible, and the development of soft spots is delayed longer than is the case with baseballs of this type as now made.

When vulcanization is completed, the pressure within the ball is relieved, either through the hypodermic needle or, if no needle is used, by puncturing the cover 28 as at 25 (Fig. 8), thereby allowing the compressed air, gas, or steam to issue from the center of the ball. The moisture within the ball center which remained therein at the time the kapok was subjected to contact with steam is partially retained when the internal pneumatic pressure is relieved, serving to prevent the kapok from becoming unduly dry when the heat of vulcanization is applied. In any event, this applied moisture serves to prevent loss of moisture, naturally present in the kapok, under the action of the vulcanizing heat and subsequent venting of the ball center.

If the kapok is allowed to become dry, its fibers are broken, and in some cases become finely pulverized both during vulcanization and afterward when the ball is being used in play, with the result that the ball loses the resiliency which is necessary for satisfactory performance.

After the pressure within the ball is relieved, the ball is removed from the mold and when cool is ready for use. It is to be observed that, however the internal pneumatic pressure is created, it is essential that it be relieved before the mold is parted. Otherwise rupture of the ball cover would occur. If the internal pressure is only that caused by heat expansion of the air, or vaporization of moisture, normally present within the kapok, the pressure can be relieved by the simple expedient of cooling the ball before removal of the mold from around it. If, however, additional pressure is desired in order to form a more perfect cover, as described above, and such pressure is established by means of injected air or gas, or by means of gas generated either by a chemical pill or by vaporization of an internally disposed liquid such as ammonia, or by steam formed from a supernormal water content of the kapok, it is essential that such additional pressure be relieved through the hypodermic needle or by puncturing the outer cover 18.

Fig. 9 shows an alternative means for applying the vulcanizable rubber material for the cover 18. Small metallic or stiff rubber pins 26 are secured to the ball center, and these pins are used as a means of mounting the center within the mold parts 23 and 24. The pins are placed radially in the equatorial plane of the center coinciding with the plane of the meeting faces of the mold and are of sufficient length to project into small receiving grooves (not shown) formed in these meeting faces. The pins serve to suspend the center between the two halves of the mold with the outer surface of the center concentrically spaced from the interior surface of the mold.

Vulcanizable liquid rubber is then forced under pressure through a conduit 29 into a chamber 27 so formed. The rubber material is forced into all portions of this chamber and is brought into intimate contact with the face of the mold. The pressure of the liquid rubber also serves to put all the component parts of the ball under pressure, which may be augmented by the admission of air through a hypodermic needle or by any of the other means above outlined. The ball is then vulcanized, the internal pressure relieved if advisable, and the ball removed from the mold as before.

In the drawings the thicknesses of the layers of rubber 15 and 18, the layers of rubber cement 14 and 17a, and the layers of yarn 12 and 17 are magnified for clarity of disclosure. The thickness of the entire cover portion 18 of the ball from the outer surface of the kapok mass 11 to the outer surface of the completed ball is, relative to the diameter of the mass of kapok, substantially less than that shown in the drawing.

It will be understood that many unessential variations in the structure of the ball and the method of manufacture can be made without departing from the spirit of this invention. The kapok 11 may have a small central core of hard rubber or other material, or the kapok may be formed around a small hollow sphere of rubber or other material if it is desired to lighten the weight of the ball or secure some other desired result.

The outer rubber cover may be pre-molded in sections, as in hemispherical cups, and during the molding operation may be either partially or wholly vulcanized and have embossed thereon markings representing seams and stitching or other designs molded on the outer surface. These molded sections may then be applied to the ball center and vulcanized in place upon the layer of yarn 17 in a mold or by the simple application of heat, or the sections may be coated on their inner face with self-curing liquid cement and applied to the ball center. If molded upon the center, pressure may be applied internally as described above.

If it is desired to produce a leather covered ball, the process is modified. The outer rubber cover is applied as before, but is preferably of less thickness. The leather cover may then be applied outside the outer rubber cover, and any of the known methods of securing it to the ball may be used. The ball may be vulcanized prior to the application of the leather cover, or the leather cover may be coated on the inner surface with latex or liquid rubber and applied to the unvulcanized outer rubber cover and the completely assembled ball placed in the mold and vulcanized, either with or without the application of internal pneumatic pressure.

The word "vulcanizable" has been used in the above description to describe rubber material, either solid or liquid, which is capable of vulcanization, and is applicable to rubber material which has been partially vulcanized as well as to that which has been subjected to no vulcanizing action.

One main feature of this invention is the provision in a ball having a solid or substantially solid fibrous center of a double-walled rubber cover, between which is interposed elongated fibrous material, the entire cover being preferably integrally united. A cover of this character enables a more efficient use of internally applied pneumatic pressure to make a perfectly molded and uniformly dense cover, and when integrally formed provides a cover more resistant to circumferential stresses and less subject to relative displacement of its component parts. Another main feature is the provision of a supernormal content of water in the fibrous center of the ball, which prevents undue desiccation of the ball when vulcanized, with resultant pulverization of its fibers and loss of elasticity of the ball in play.

We claim as our invention:

1. A method of making a game ball comprising: taking a compacted, roughly shaped mass of material having the physical qualities of kapok; impregnating said mass with a supernormal content of water; applying a gas-tight, vulcanizable rubber envelope to said mass; covering said enveloped mass with elongated fibrous material to form a ball center; enveloping said center with cover material comprising vulcanizable rubber material to form a ball; placing said ball in a mold; vulcanizing said ball; establishing pneumatic pressure within said gas-tight rubber envelope prior to the completion of said vulcanization; relieving said pressure through a vent from said mass to the ball exterior; and removing said ball from said mold.

2. A method of making a game ball comprising: taking a compacted, roughly shaped mass of material having the physical qualities of kapok; impregnating said mass with a supernormal content of water; applying a gas-tight vulcanizable rubber envelope to said mass; covering said enveloped mass with elongated fibrous material to form a ball center; enveloping said center with cover material comprising vulcanizable rubber material to form a ball; placing said ball in a mold; vulcanizing said ball; and removing said ball from said mold.

3. A method of making a game ball comprising: taking a compacted, roughly shaped mass of material having the physical qualities of kapok; applying a gas-tight, vulcanizable rubber envelope to said mass; covering said enveloped mass with elongated fibrous material to form a ball center; enveloping said center with cover material comprising vulcanizable rubber material to form a ball; placing said ball in a mold; vulcanizing said ball; establishing pneumatic pressure within said gas-tight rubber envelope prior to the completion of said vulcanization, whereby non-pneumatic, centrifugally acting, compressive stresses are mechanically applied to said cover material; relieving said pressure through a vent from said mass to the ball exterior; and removing said ball from said mold.

4. A method of making a game ball comprising: taking a compacted, roughly shaped mass of material of the physical qualities of kapok; impregnating said mass with a supernormal content of water; applying a gas-tight, vulcanizable rubber cover to said mass; vulcanizing said rubber cover with heat; and venting water vapor from said mass to the ball exterior.

5. A method of making a game ball comprising: forming a compacted fibrous core; applying a first envelope of gas-tight, vulcanizable rubber to said core; covering said enveloped core with tension-resisting fibrous material to form a ball center; applying to said center a second envelope comprising vulcanizable rubber to form a ball; placing said ball in a mold; vulcanizing said ball by the application of heat; establishing pneumatic internal pressure within said first gas-tight rubber envelope prior to the completion of said vulcanization, the degree and duration of said heat and pressure being sufficient to cause the rubber material of said first envelope to centrifugally permeate said fibrous material and of said second envelope to centripetally permeate said fibrous material to such an extent that the two envelopes are united into one rubber envelope having imbedded therein said tension-resisting fibrous material; relieving said pressure; and removing said ball from said mold.

6. A method of making a game ball comprising: forming a compacted fibrous core; applying a first envelope of gas-tight, vulcanizable rubber to said core; covering said enveloped core with tension-resisting fibrous material to form a ball center; mounting said ball center with its outer surface in uniformly spaced relationship with the inner walls of a mold; injecting under pressure vulcanizable rubber into the spheroidal space between said center and said mold; vulcanizing said ball by the application of heat; establishing pneumatic internal pressure within said first gas-tight rubber envelope prior to the completion of said vulcanization, the degree and duration of said heat and pressure being sufficient to cause the rubber material in said space and the rubber material of said first envelope to permeate said fibrous material centripetally and centrifugally respectively and mutually coalesce; relieving said pressure; and removing said ball from said mold.

WILLIAM J. VOIT.
LEITH C. WEIMER.